Feb. 20, 1962   J. METZ   3,021,701
CLOTHES WASHING MACHINE AND SINGLE PHASE
INDUCTION MOTOR THEREFOR
Filed June 23, 1960   3 Sheets-Sheet 1

Inventor
Jean Metz
By
Attorney

Feb. 20, 1962 J. METZ 3,021,701
CLOTHES WASHING MACHINE AND SINGLE PHASE
INDUCTION MOTOR THEREFOR
Filed June 23, 1960 3 Sheets-Sheet 2

Inventor
Jean Metz
By John P. Kearns
Attorney

United States Patent Office 3,021,701
Patented Feb. 20, 1962

3,021,701
CLOTHES WASHING MACHINE AND SINGLE PHASE INDUCTION MOTOR THEREFOR
Jean Metz, Anthony, France, assignor to General Motors Corporation, Detroit, Mich., a corporation of Delaware
Filed June 23, 1960, Ser. No. 38,309
Claims priority, application Great Britain Aug. 7, 1959
10 Claims. (Cl. 68—24)

This invention relates to single-phase capacitor start induction motors.

A double pole double-throw switch is necessary to effect reversal in single phase induction motors if the split-phase start winding is connected in parallel with the main winding—that is when the terminals of the start winding are connected to the opposite ends of the main winding: but a single-pole double-throw switch is sufficient if the start winding is connected in a swing connection—that is with one terminal of the start winding connected to a center tap on the main winding and the other terminal connected to an end of the main winding.

The parallel connection of the start winding results in a larger starting torque than does the swing connection. The double-pole reversal switch of the parallel connection is, however, considerably more expensive and complicated than the single-pole switch of the swing connection, especially when the reversal switch is automatically operated.

For some apparatus it is desirable to have at will either frequent automatic motor reversal and low starting torque, or unidirectional motor rotation and high torque.

This is the case in some clothes washer machines in which the direction of rotation of the clothes tub is periodically automatically reversed for washing, and the tub is spun at a high speed for drying. For washing, a low starting torque is required, and for drying a high starting torque is required.

A single phase induction motor according to this invention may advantageously be used in such clothes washer machines, and its split phase start winding is connectible either in a parallel connection for a high starting torque or in a swing connection for low starting torque and reversal by a single-pole switch.

When the motor is used in a clothes washer machine, the starter winding is connected in swing connection during washing operation when a low starting torque but frequent motor reversal are required, and in a parallel connection during the drying operation when a high starting torque and unidirectional motor rotation are required.

The scope of the invention is defined by the appended claims; and how it may be performed is hereinafter particularly described with reference to the accompanying drawings, in which:

Figure 2:
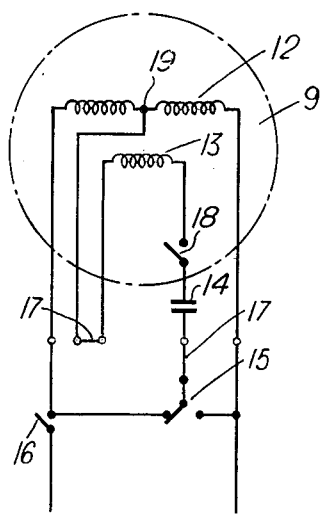
FIGURES 2 and 3 are diagrammatic wiring diagrams of one motor for the washer machine.
Figure 3:
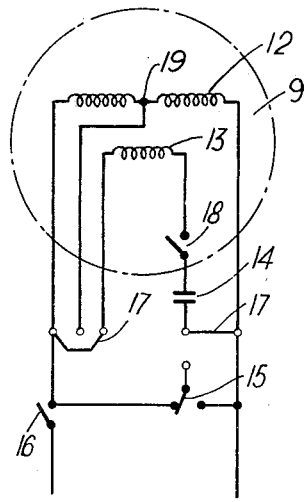
Figure 4:
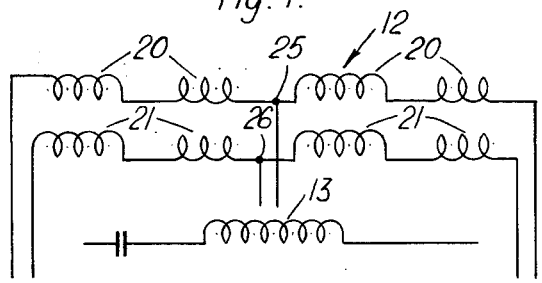
FIGURES 4 to 7 are diagrammatic wiring diagrams of another motor for the washer machine.
Figure 5:
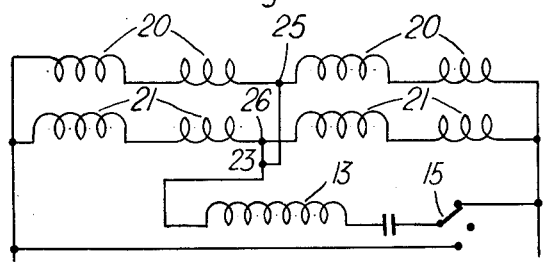
Figure 6:
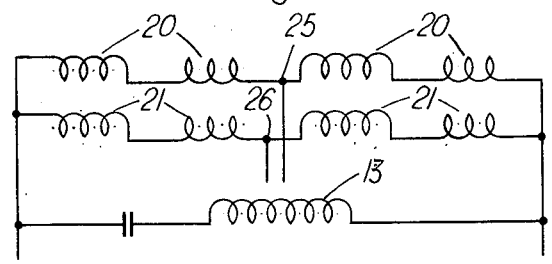

As far as possible, the same reference numerals are used in FIGURES 4 to 7 as in FIGURES 2 and 3.

Figure 1:
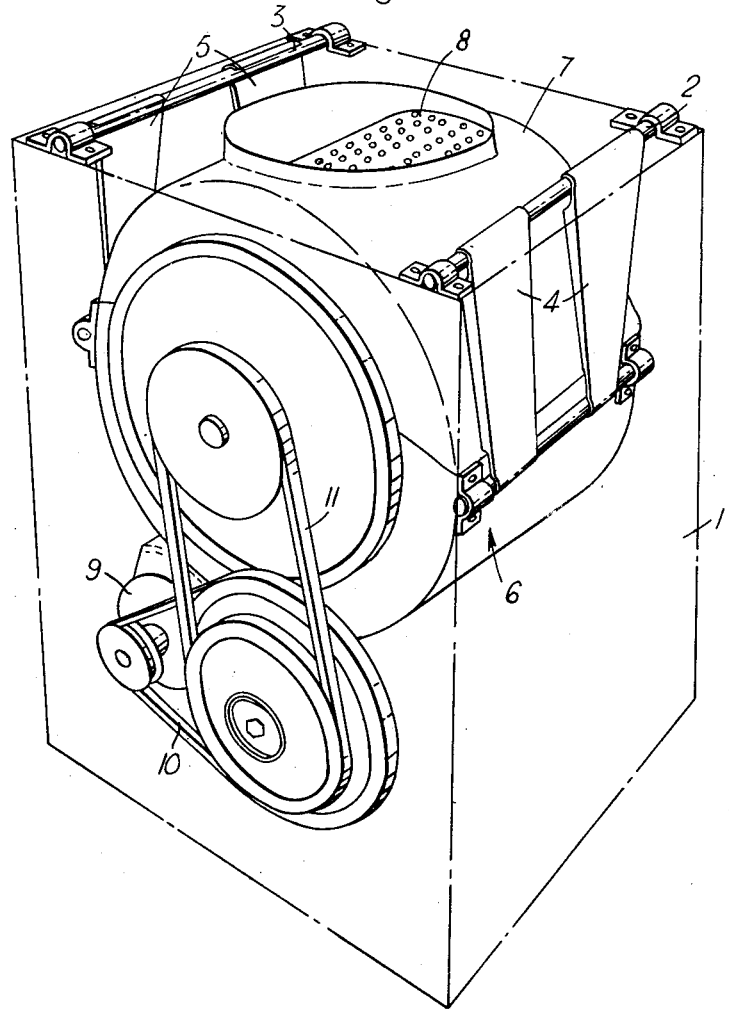
FIGURE 1 is a perspective view of a washer machine.

The washer machine (FIG. 1) comprises an open-topped cabinet 1, two parallel shafts 2 and 3 fitted to opposite sides of the top of the cabinet, hanger arms 4 and 5 rotatably mounted on the shafts 2 and 3 respectively, and an assembly 6 supported by the lower ends of the hanger arms.

The assembly 6 comprises a cylinder 7, a tumbler clothes tub 8 rotatably mounted in the cylinder about a horizontal axis and a single phase induction motor 9 arranged to drive the tub through a drive mechanism which includes belts 10 and 11 and a device for changing the gear ratio of the mechanism.

The motor 9, which is shown diagrammatically in FIGURES 2 and 3, comprises a main winding 12, a split phase winding 13 in series with a capacitor 14, an automatic reversal switch 15, a main supply switch 16, a control switch 17, and a switch 18 between the phase winding 13 and capacitor 14.

The control switch 17 is operable to connect the phase winding 13 in a parallel connection (FIG. 3) with the reversal switch 15 inoperative, or in a swing connection (FIG. 2) in series with the reversal switch 15. In the parallel connection one end of the phase winding 13 is connected to one end of the main winding 12, and the opposite end is connected to the opposite end of the main winding: in the swing connection one end of the phase winding is connected to a center tap 19 on the main winding and the other end is connected to the reversal switch 15.

The reversal switch 15 is a single pole switch operative to connect one end of the phase winding 13 to either end of the main winding.

In use, the clothes are inserted into the tub, and water and detergent are fed to the tub. The tub is then driven at a low speed of between 50 and 55 revolutions per minute by the motor in the swing connection, after operation for between 10 and 20 seconds, is de-energised by the reversal switch 15. The tub comes to a halt rapidly owing to the water in the cylinder, and after an interval of about 5 seconds, the reversal switch automatically restarts the motor in the opposite direction. Rotation is then effected for between 10 and 20 seconds and is followed by a second interval of 5 seconds.

The sequence is then repeated: the tub being rotated alternately in opposite directions for periods of between 10 and 20 seconds, there being intervals of 5 seconds between the rotations in opposite directions. Subsequently the tub is unidirectionally rotated by changing the gear ratio between the motor and tub at a speed higher than the speed used during the washing operation to effect a centrifuging or spin drying of the clothes. Simultaneously the phase winding is connected in the parallel connection and the motor reversal switch 15 is cut out of circuit, so that during spin drying, the tub is rotated in one direction only.

To enable the motor to be used with different supply voltages, the main winding 12 of the motor shown in FIGURES 4 to 7 has advantageously two sections 20, 21 connectible in parallel (FIG. 5) for a low voltage source and in series (FIG. 7) for a high voltage source. When the sections 20, 21 are in parallel, the control switch is operative either to connect the split phase winding in parallel (FIG. 6) with both sections for a high starting torque or one terminal 23 of the phase winding 13 to a center tap 25, 26 on both sections (FIG. 5) in a swing connection for reversal by the automatic single pole reversal switch 15.

Figure 7:
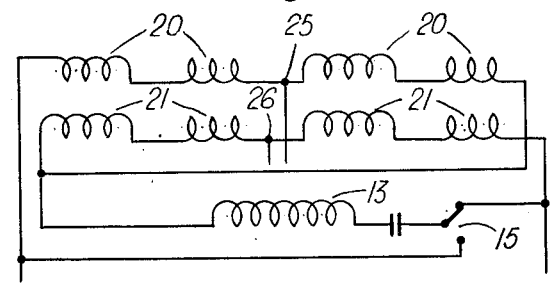

When the sections are in series, one terminal of the phase winding is connected between the sections 20, 21 in a swing connection (FIG. 7). The starting torque, with the high voltage is sufficient in a washer machine to render it unnecessary to connect the phase winding 13 in parallel with both sections of the main winding.

I claim:

1. A single phase induction motor comprising a main winding having a center tap between sections extending to opposite ends thereof, a split phase winding having opposite terminal ends, and a control switch operable to connect the phase winding either in a parallel connection across opposite ends of said main winding as well as for connection of one terminal end of said phase winding to said center tap on said main winding and opposite terminal end of said phase winding to one end of said main winding.

2. A single phase induction motor comprising a main winding having a center tap between sections extending to opposite ends thereof, a split phase winding having opposite ends, an automatic reversal switch and a control switch operable to connect said phase winding either in a parallel connection across opposite ends of said main winding with said reversal switch inoperative as well as swing connection in series with said reversal switch to connect one terminal end of said phase winding to said center tap on said main winding, said phase winding having an opposite terminal end connected to one end of said main winding.

3. A single phase induction motor comprising a main winding having a tap between sections extending to oppositie ends thereof, a split phase winding having opposite terminal ends, an automatic single pole reversal switch and a control switch operable to connect said phase winding either in a parallel connection across said main winding with said reversal switch inoperative as well as for phase winding connection in series with said reversal switch to have one terminal end of said phase winding connected to said center tap and the other terminal end connected to an end of said main winding.

4. A single phase induction motor comprising a main winding, said main winding having two sections connectible in parallel or in series between opposite ends thereof, a split phase winding having opposite terminal ends, an automatic single pole reversal switch and a control switch operable when said sections are in parallel to connect said phase winding either in a parallel connection across said main winding with said reversal switch inoperative as well as for connection of one terminal end of said phase winding directly to a center tap in both sections and the other terminal end to said automatic reversal switch.

5. A single phase induction motor comprising a main winding having a tap between sections extending to opposite ends thereof, a split phase winding having opposite terminal ends, a reversal switch, and a control switch operable to connect said phase winding either in a parallel connection with said reversal switch inoperative as well as for connection across said main winding with said reversal switch in series with said phase winding having one terminal end thereof connected to said tap on said main winding and the other terminal end connected to one end of said main winding.

6. A single phase induction motor comprising a main winding having a tap between sections extending to opposite ends thereof, a split phase winding in series with a capacitor, a single pole reversal switch, and a control switch operable to connect said phase winding either in a parallel connection across said main winding with said reversal switch inoperative as well as for connection with said reversal switch in series with said phase winding having said capacitor together therewith connected from one end of said main winding to said tap on said main winding.

7. A single phase induction motor comprising a main winding, said main winding having two sections in pairs connectible either in series or in parallel, a split phase winding, an automatic single pole reversal switch, and a control switch operable, when said sections are in parallel, to connect said phase winding either in a parallel connection across said main winding with said reversal switch inoperative as well as for connection of said phase winding with said reversal switch in series with both of said sections of said main winding.

8. A washer machine comprising a cabinet, a tub rotatably mounted in said cabinet about a horizontal axis, a single phase induction motor, and a drive mechanism connecting said motor and said tub, said drive mechanism including a device for changing the gear ratio of said mechanism, and said motor comprising a main winding having tap means between sections extending to opposite ends thereof, a split phase winding, a single pole reversal switch, and a control switch operable to connect said phase winding either in a parallel connection across said main winding with said reversal switch inoperative for high speed unidirectional spinning of said tub as well as for connection of said phase winding in series with said reversal switch between said tap means and opposite ends of said main winding for periodical reversal of slow speed rotation of said tub.

9. A washer machine comprising a cabinet, a tub rotatably mounted in said cabinet about a horizontal axis, a single phase induction motor, and a drive mechanism connecting said motor and said tub, said drive mechanism including a device for changing the gear ratio of said mechanism, and said motor comprising a main winding, said main winding having a tap means between opposite ends of two sections connectible either in series or in parallel, means for connecting said sections in series or in parallel, a split phase winding, a single pole reversal switch, and a control switch operable, when said means connect said sections in parallel, to connect said phase winding either in a parallel connection across said main winding with said reversal switch inoperative for high speed unidirectional spinning of the tub as well as for connection of said phase winding in series with the reversal switch between said tap means and opposite ends of said sections for periodical reversal of slow speed rotation of said tub.

10. A washer machine comprising a cabinet, a tub rotatably mounted in said cabinet about a horizontal axis, a single phase induction motor, and a drive mechanism connecting said motor and said tub, said drive mechanism including a device for changing the gear ratio of said mechanism, and said motor comprising a main winding, said main winding having a center tap between opposite ends of two sections connectible either in series or in parallel, a split phase winding having opposite terminal ends, an automatic single pole reversal switch, and a control switch operable, when said sections are in parallel, to connect said phase winding either in a parallel connection across said main winding with said reversal switch inoperative for high speed unidirectional spinning of the tub as well as for connection with one terminal end of said phase winding connected to said center tap on both of said sections and the other terminal end in series with said reversal switch to one end of said main winding for periodical reversal of slow speed rotation of the tub.

References Cited in the file of this patent
UNITED STATES PATENTS

| | | |
|---|---|---|
| 2,225,407 | Bassett | Dec. 17, 1940 |
| 2,511,315 | Adamek | June 13, 1950 |